No. 821,294. PATENTED MAY 22, 1906.
C. E. JOHNSON.
STATION INDICATOR.
APPLICATION FILED JAN. 30, 1905.
4 SHEETS—SHEET 1.
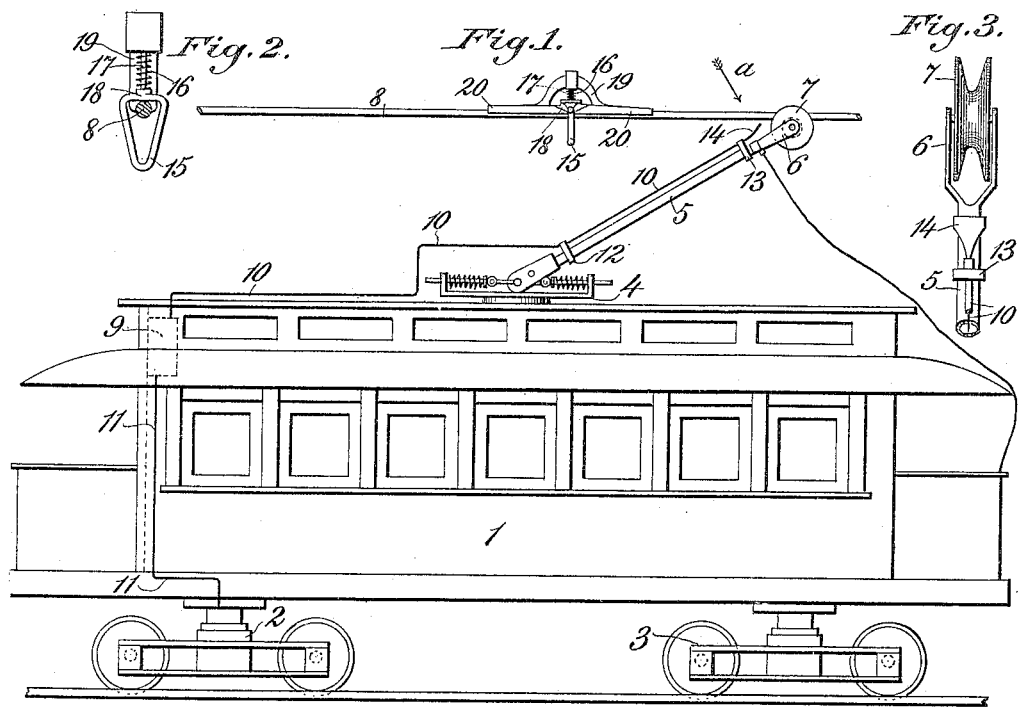
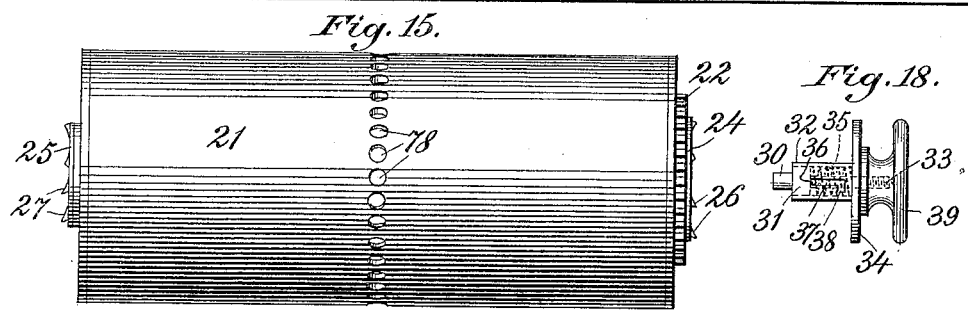
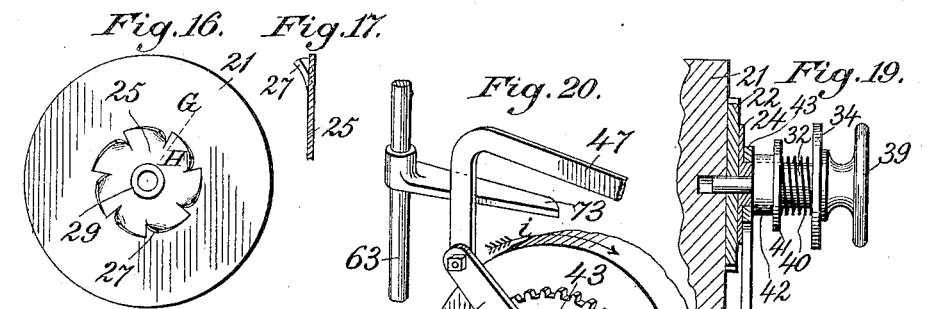
Witnesses:
L. A. Newport
Francis M. Springer
Inventor
Charles E. Johnson
by Thompson R. Bell
his attorney

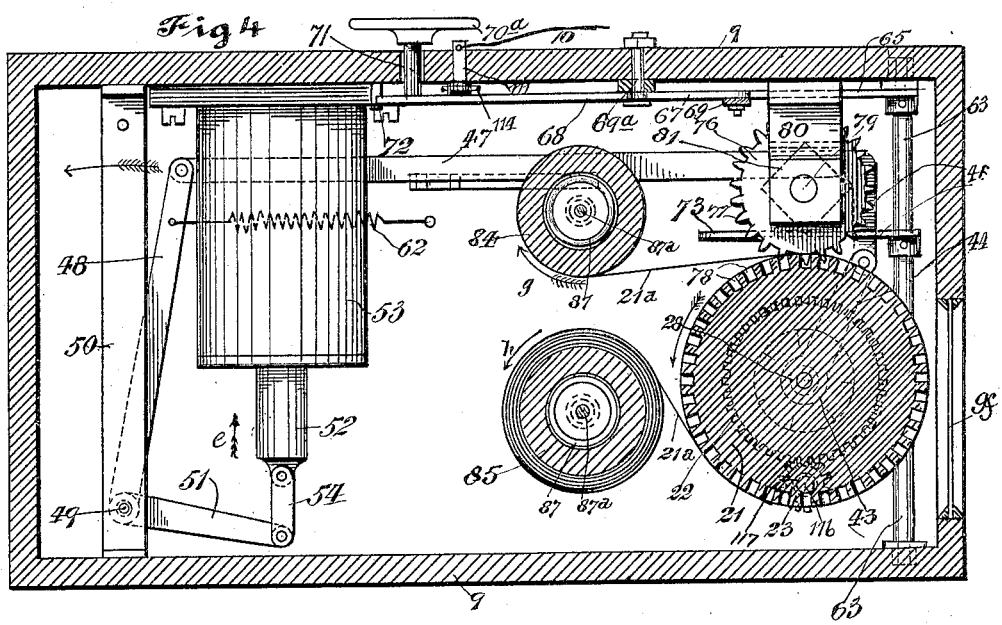

No. 821,294. PATENTED MAY 22, 1906.
C. E. JOHNSON.
STATION INDICATOR.
APPLICATION FILED JAN. 30, 1905.
4 SHEETS—SHEET 3.
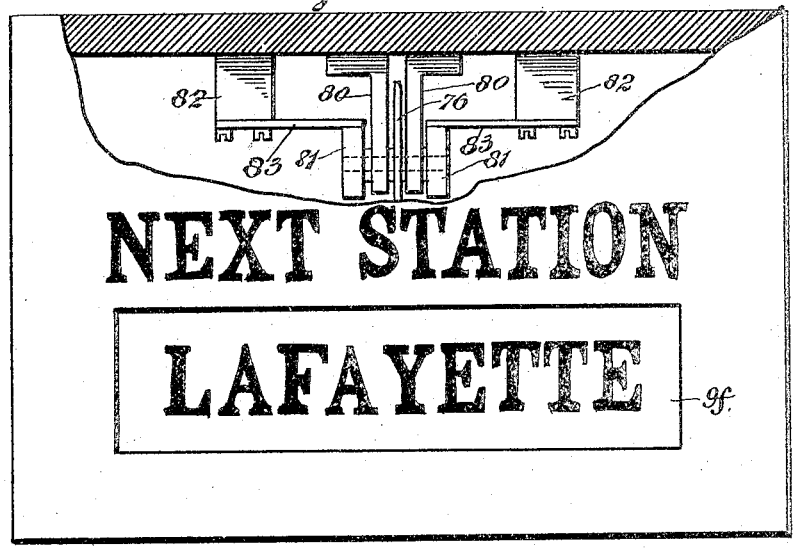
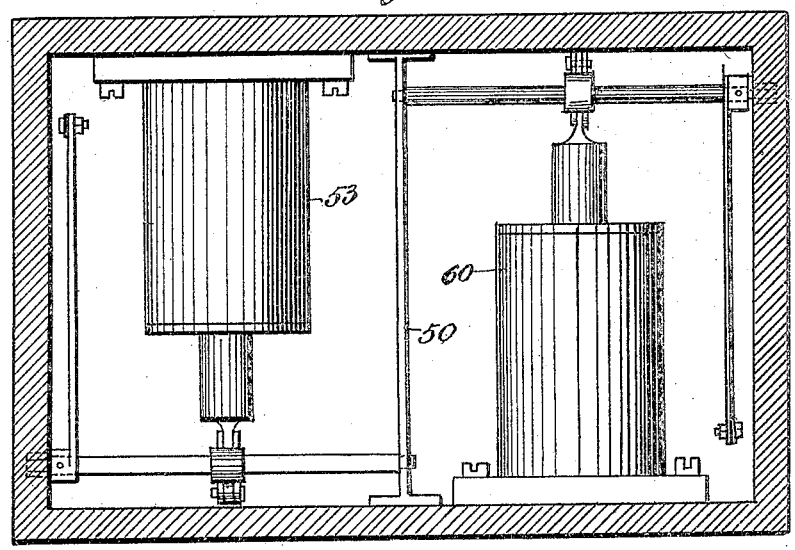

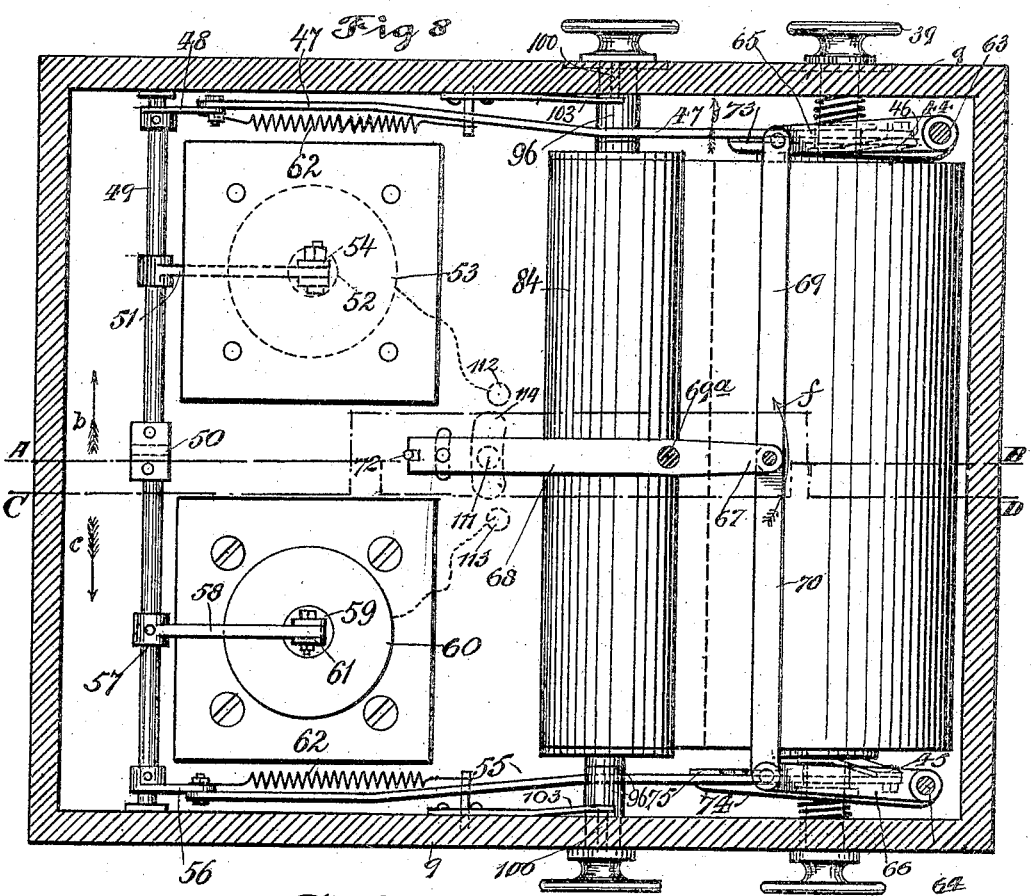

UNITED STATES PATENT OFFICE.

CHARLES E. JOHNSON, OF INDIANAPOLIS, INDIANA.

STATION-INDICATOR.

No. 821,294.     Specification of Letters Patent.     Patented May 22, 1906.

Application filed January 30, 1905. Serial No. 243,422.

*To all whom it may concern:*

Be it known that I, CHARLES E. JOHNSON, a citizen of the United States, residing at Indianapolis, in the county of Marion and State of Indiana, have invented certain new and useful Improvements in Station-Indicators, of which the following is a specification, reference being had therein to the accompanying drawings.

This invention relates to station-indicators, and is particularly adapted to be used in steam or electric railroad cars to indicate the station the car is approaching; and it consists in the means for operating the indicator mechanism or the mechanism constituting the indicator mechanism, as hereinafter described, and particularly pointed out in the claims.

The objects of this invention are to provide an indicating band or belt upon which the names of the stations are printed in order of succession, which band or belt is arranged to extend around and under a revoluble positively-operated indicating-roller to accurately and positively indicate the names of the stations in their order of rotation either when the car is outwardly bound or inwardly bound; to provide mechanism whereby the indicating band or belt when passing around the indicating-roller will operate positively with the movement of the periphery of said indicating-roller—in other words, to provide a means to prevent the said belt or band slipping on the periphery of said indicating-roller; to provide take-up or winding rollers, whereby the ends and unexposed surfaces of the belt or band will be wound or taken up and rolled upon said rollers, thereby retaining said indicating belt or band in close contact with the periphery of said indicating-roller; to provide means whereby the said take-up rollers and the indicating-roller may be readily removed from and replaced into their respective positions when so desired. I attain these objects by means of the indicator and the operating mechanism thereof illustrated in the accompanying drawings, in which similar numerals of reference designate like parts throughout the several views.

Figure 1 is a side elevational view of a street-car, showing the terminal of the indicator conducting-wire carried by the trolley-pole and insulated from the trolley-pole. Fig. 2 is an indicator link conductor, which is suspended from the main trolley wire or conductor. Fig. 3 is a view of the trolley end of the trolley-pole looking in the direction of the arrow *a* and showing the terminal of the indicator conducting depending wire. Fig. 4 is a longitudinal section view of the indicator, taken through the line A B (see Fig. 8) and looking in the direction of the arrow *b*. Fig. 5 is a similar sectional view of the same, taken through the line C D (see also Fig. 8) and looking in the direction of the arrow *c*. Fig. 6 is a front view of the in-indicator, showing the indicator belt or band retaining wheel and the controlling mechanism thereof. Fig. 7 is an end view of the indicator mechanism, showing the alternately-operated solenoids whereby the indicating-roller is intermittingly rotated with either a forward rotation or a backward rotation. Fig. 8 is a plan view of the indicator mechanism. Fig. 9 is a longitudinal sectional view of one of the take-up or winding rollers of the indicator belt or band. Fig. 10 is a longitudinal sectional view of the spring-pivot of one of the ends—*i. e.*, the spring take-up end—of one of the winding or take-up rollers. Fig. 11 is an end view of the knob of said pivot of the take-up rollers, showing ratchet-teeth formed on the face of the collar of said pivotal knob and taken through the line E F (see Fig. 10) and looking in the direction of the arrow *d*. Fig. 12 is an end view of the take-up or winding roller. Fig. 13 is a longitudinal sectional view of the opposing pivot of the take-up or winding roller. Fig. 14 is a perspective view of one of the pawls and pawl-springs of the ratchet-teeth of the knobs of the take-up or winding rollers. Fig. 15 is an elevation of the indicating-roller. Fig. 16 is an end view of one end of the same, showing the ratchet-disk thereof. Fig. 17 is an enlarged broken sectional view of one of the ratchet-disks of the indicating-roller and taken through the line G H. (See Fig. 16.) Fig. 18 is a view of the pivot or trunnion of the indicating-roller, showing the pivotal center and the carrying-socket thereof and also the trunnion-retaining pin and the retaining notched slot formed in said carrying-socket. Fig. 19 is a part longitudinal sectional view of the end portion of the indicator-roller, showing the yielding retaining means for retaining the pawl thereof in engagement with the feed or disk ratchet of said indicating-roller. Fig.

20 is a perspective view of one end of the indicating-roller, showing the means whereby the pawl-levers are alternately thrown or moved out of or into engagement with their feed or disk ratchets; and Fig. 21 is a detail view of the hand-operated pinion for turning the indicator-roller and the sleeve-bearing therefor.

In Fig. 1, the numeral 1 designates a street-car of any suitable construction, supported and carried by a forward truck 2 and a rearward truck 3. On the top or roof portion of the car 1 is secured in the usual or any suitable manner the trolley-pole base 4, from which extends the trolley-pole 5, the harped or forked end 6 of which carries the trolley-wheel 7, which latter contacts the trolley wire or conductor 8.

The indicator-box 9 is preferably situated at the front interior top portion of the car with its face 9ᶠ or glass front directed backwardly, as shown, Figs. 4 and 5, and connected to suitable terminals in the box is the positive independent conductor 10 and the negative or ground conductor 11. The ground-conductor 11 extends from the box to the truck, and the positive conductor 10, which is insulated through its entire length, extends to the pole 5, to be supported by the insulated bands 12 and 13. On the trolley end of the conductor 10 is formed a flaring plate-terminal 14, which is situated slightly in advance of the trolley-wheel 7, so that as the car, and consequently the trolley-pole, advances the flaring plate-terminal 14 will strike the depending conductor 15 to produce a momentary contact to excite either of the electromagnets (that one with which the conductor is connected) or solenoids to operate the interior mechanism. The link, it will be observed, is narrowed down toward its depending end, so that when brought in contact with the conducting-wire the flanges of the trolley-wheel 7 will pass each side of said narrowed bottom end of the link without excessive jar and permit the trolley-wheel to move along its conductor without being thrown wholly out of contact with the latter.

A spring 16, surrounding the spring-post 17, bears against the plate or base 18, formed on the top portion of the link 15, and the same is provided to yieldingly maintain the link 15 in its vertical or depending position and prevent the said link 15 when forced up into contact with the main conductor 8 sticking or from some cause being prevented from returning to its depending position. A bridge 19 spans over the top spring end of said link 15 to support the end 20 of the conductor-supporting foot.

The indicator mechanism is inclosed in a box 9 or any other suitable inclosure which is provided for the purpose of protecting said indicator mechanism. The indicator-roller 21 is provided at one end with a gear-wheel 22, which meshes with a gear wheel or pinion 23, the purpose of which latter will be hereinafter described. On each of the ends of said roller are secured the right and left hand ratchet-disks 24 and 25. The ratchet-disks 24 and 25 are notched at equal distances apart around their peripheries, bent over on one side to form the side projecting or face teeth 26 and 27, and centrally on the face of the ratchet-disks are formed the hubs or bosses 28 and 29, which are drilled or bored to receive their centers or trunnions 30. The trunnions 30 are provided with the collar portions 31, which are turned to fit and to slide longitudinally in the bores of the sleeves or sockets 32, and the reduced or spring-stem ends 33 of the said centers or trunnions 30 extend centrally and longitudinally through the closed or outer ends of said sockets 32, at which ends the integral collars or flanges 34 are situated, which collars are drilled to receive suitable wood-screws to secure them to the sides of the indicator-box 9 to securely hold said sleeves or sockets in positions to retain the centers or supporting-trunnions 30 in their respective positions on the opposing sides of the indicator-box, so that the opposing centers or trunnions 30 will be in alinement.

Coil-springs 35 encircle the spring-stems 33 and are situated between the closed ends of the sleeves or sockets 32 and the collars 31. Stop or catch pins 36 are secured to the collars 31 to extend radially from the periphery of the latter to project through the slots 37. On the ends of the slots 37 are formed the notches 38, which are provided for the purpose of receiving the pins 36 to retain the pivots 30 out of engagement with their end bosses 28 and 29 on the indicating-roller 21 when it is required to remove or replace the latter. The ends of the spring-stems 33 are threaded, and on said ends are screwed the retaining-knobs 39. The knobs 39, situated in the walls of the case at opposite ends of the roller 21, are provided, so that the operator may take hold of each of them to withdraw the pivots 30 from engagement with the roller 21, so that the latter can be readily moved when such is required.

Encircling the sleeves or sockets 32 are the springs 40, each of which has one of its ends bearing against the collar 34 and its opposite end bearing against the sliding collar 41. The sliding collars 41 are adapted to loosely fit on the sockets 32 to slide thereon, and integral on one of the sides of said collars 41 are formed the sleeves 42, which sleeves bear against the center portions 43 of the upwardly-extending pawl-levers 44 and 45, situated on the opposite ends of the indicating-roller 21, to yieldingly retain said levers 44 and 45 in contact with the disk-ratchets 24 and 25 to be in position each to engage the ratchet-teeth of its ratchet-disk.

The upwardly-extending pawl-lever 44 has its upper end connected to the forward downwardly-extending bent end 46 of the connecting-rod 47, the opposite end of which latter is connected to the lever 48. The lever 48 is secured to its shaft 49, the reduced journal ends of which are mounted in suitable bearings, one in the side of the box 9, the other in a bore or bearing formed in the lever-shaft-supporting standard 50. A lever 51 is secured on said shaft 49 and has its free end connected to the core 52 of the solenoid 53 by the connecting-links 54, so that when the solenoid 53 is excited the core is moved in the direction of the arrow $e$ (see Fig. 4) to swing or move the lever 44 to rotate the roller 21 a portion of a revolution or that amount of rotation necessary to move the indicator-ribbon sufficiently to move the name of the next station into position to be observed.

The downwardly-extending lever 45 has its end connected to the end of the connecting-rod 55, and the said connecting-rod has its opposite end connected to the lower end of the depending lever 56, which latter is secured on the shaft 57. The ends of the shaft 57 are supported in suitable bearings formed in the side of the box and in the standard 50, similar in every respect to the shaft 49. The lever 58 is secured on the shaft 57 and has its end connected to the core 59 of the solenoid 60 by the connecting-links 61. Springs 62 are connected to each of the levers 48 and 56 and are provided for the purpose of moving and yieldingly retaining the cores 52 and 59 into their relative positions, as illustrated in Figs. 4 and 5—that is, the initial or starting positions.

Vertically-extending throw-out shafts 63 and 64 have their top and bottom ends journaled in suitable bearings or bushings secured in the top and bottom forward side portions of the indicator-box 9. Situated at or near the top ends of said shafts 63 and 64 and secured thereto are the levers 65 and 66, which have their ends connected to the end 67 of the switch-lever 68 by the connecting-rods 69 and 70. The switch-lever 68 is pivoted on its supporting-pin 69ª, secured to the top part or wall of the box 9. A knob 70ª is situated above the exterior top portion of the box 9 and is connected to the lever 68 by a connecting-stem 71, so that said switch may be operated from the exterior of the indicator-box 9 and sprung or pushed out of engagement with its stop-pin 72 to permit a free movement of said lever to either side of said stop-pin. The stop-pin 72 is situated at the free end of the lever 68, centrally with the end throw thereof, and said pin is adapted to engage the slotted end portion of said lever 68 when the latter is in mid-position, thereby holding the levers 44 and 45 out of engagement with their ratchet-disks 24 and 25, respectively. This is accomplished by the following mechanism: A lever 73 is secured on the shaft 63 in position thereon so that said lever 73 will be situated in the plane of the sweep of the bend 46 of the connecting-rod 47. Similarly, the lever 74 is secured on the shaft 64 at the bottom portion thereof, and on the free end of the said lever is the upwardly-projecting lug 75, which is situated so that it may be moved in position to contact the inner side of the connecting-rod 55 and move the same, so that when the arm 67 of the switch-lever 68 is moved in the direction of the arrow $f$ the lever 73 is simultaneously moved in the same direction, and thus the connecting-rod 47 and its pawl-lever 44 are moved away from the ratchet-disk 24, while the lug 75 of the lever 74 releases the connecting-rod 55 and permits its pawl-lever 45 to engage with the teeth 27 of the pawl-disk 25, and when the switch 68 is moved in the opposite direction the pawl 45 is removed from its ratchet and the lever 44 is released and permitted to engage with its ratchet to intermittingly rotate the indicating-roller 21 in the opposite direction.

In order that the indicating belt or band will move positively with and through the same distance as that of the periphery of the indicating-roller 21, I provide the retaining disk wheel 76, having the peripheral blunted teeth 77, which is situated centrally over the said indicating-roller 21 and in such position that the teeth 77 of said disk will register or mesh with the peripheral recesses or openings 78, spaced at regular intervals around the periphery of the roller 21, thereby tightly and positively holding the said indicating belt or band 21ª to move positively with the periphery of the indicating-roller 21. The indicating-belt 21ª is of canvas or other pliable and elastic material which is of a proper width and texture. The retaining disk wheel 76 is firmly secured on the arbor 79, which is journaled at its ends in the depending hanger-bearings 80, which are secured to the inner side of the top of the box 9. On the outer projecting ends of the arbor 79 are secured the four-sided stops 81, which are provided to exert a yielding resistance against a further movement of said disk wheel than a one-quarter revolution, thereby checking and limiting the rotation of the indicating-roller 21 to that amount of movement positively imparted to it by its pawl mechanism to prevent the indicating-belt either overrunning or underrunning and insuring the names on said indicating-belt being exhibited in proper position.

Spring-blocks 82 are situated at each side of the depending hanger-bearings 80 and are secured to the top inner side of the indicator-box 9. To each of said blocks are secured the plate-springs 83, the free ends of which bear against the pair of stops 81 to exert a direct and yielding resistance against the faces of said stops 81.

In order that the extended ends of the indicator band or belt 21ª may be alternately taken up or given out and the indicator roller 21 and the said belt or band 21ª be maintained in tension to retain it in close contact with the indicating-roller 21, I provide the spring-actuated take-up or winding rollers 84 and 85, which rollers are situated one above the other or in vertical alinement and rearwardly of the indicating-roller 21, and the said rollers are arranged to receive or give out the indicating-belt 21ª as it is given out or taken up by the indicating-roller 21. The rollers 84 and 85 and their attachments are similar in every respect, and their springs are wound so that they revolve in the direction indicated by the arrows $g$ and $h$.

I will now proceed to describe one of the rollers, as the roller 84. The roller 84 is provided with the longitudinally-extending axial bore 86, in which is inclosed a suitable coil-spring 87, one end of which is scured to the roller 84 and the opposite end to the spring-winding spindle 87ª. The spring-winding spindle 87ª has its slotted or winding end pivoted in the central bore of the disk 88 and its reduced opposing end 87ᵇ in the bore of the spindle-supporting disk 89, each of which disks are situated within the bore 86 near the ends thereof, and thus the spring-winding spindle 87ª is adapted to be turned independently of the roller 84 to increase or diminish the tension of the coil-spring thereof. Secured to the ends of the winding-roller 84 are the end disks 90, which are provided with the central hubs 91, which are bored to receive their opposing pivotal centers 92 and 93, whereon each of the rollers 84 and 85 are adapted to revolve. On the projecting outer end of the trunnion or pivot 92 is formed the tongue 94, which when the pivot 92 is permitted to enter the bore of its hub 91 engages the slot 95, formed in the end of the spring-winding spindle 87ª. The center 92 therefor forms a key whereby the spindle 87ª may be wound up to increase or diminish the tension of the coil-spring 87 at pleasure. The center 92 is carried by the socket 96, which latter is provided at its closed end with the flange 97, which latter is drilled to receive suitable securing or wood screws whereby the said flange or collar is bolted to the side of the indicator-box 9 to retain the socket 96 in position. The reduced or spring stem end 98 of the center or trunnion 92 extends through the closed end portion of the socket 96 and has its threaded end screwed into the knob 99, whereby said trunnion is limited in its longitudinal movement toward its roller. The knob 99 is adapted to be revolved in one direction, and a spring-actuated pawl 100 has its flattened pawl or catch end 101 projecting through the outer surface of the flange 97 and the side of the indicator-box 9 to engage the ratchet-teeth 102, formed on the face of the collar of the knob 99, to prevent a rotation in the opposite direction. The spring-pawl 100 is operated by the plate-spring 103, secured to the inner face of the side of the box. A similar spring-pawl and ratchet is provided for the lower take-up roller 85.

A coil-spring 104 encircles the reduced stem 98 and has one of its ends bearing against the closed end of the socket 96 and its opposite end bearing against the trunnion 92 to yieldingly retain said trunnion 92 within the bore of its hub 91. A trunnion or opposing supporting-pivot 93 is provided with the collar 105, which is truly turned to slide longitudinally in the bore of the socket or sleeve 106. The socket or sleeve 106 has a flange 107 formed integral on the closed end of the socket 106 and is similar in construction to the socket and flange 97 and provided for the purpose of revolubly supporting the end of the take-up or winding roller 84. The trunnion 93 has its reduced stem 108 extended to project through the closed end of the socket or sleeve 106, the end of which is threaded to be screwed into the knob 109. In the bore of the sleeve 106 and surrounding the reduced stem 108 is a coil-spring 110, one end of which bears against the closed end of the socket 106 and the other opposing end against the collar 105 of the trunnion or pivotal center 93 to maintain the said trunnion or pivotal center 93 in the end bearing or bore of the opposing hub 91 of the take-up roller 84.

A terminal 111 is situated centrally of the indicator-box 9, as shown particularly in Fig. 8, and is connected to the independently-insulated wire 10, and said terminal is situated between the terminals 112 and 113. The terminal 112 connects with the solenoid 53, and the terminal 113 connects with the solenoid 60. An insulated switch-bar 114 is connected to and insulated from the lever 68 and remains at all times in contact with the terminal 111, so that when the lever 68 is in its central position, as shown in Fig. 8, the switch-bar 114 is not in contact with either of the terminals 112 or 113, and consequently the electromagnets or solenoids are inert and the pawl-levers 44 and 45 are withdrawn from and maintained in position out of contact with their ratchet-disks, respectively. When the lever 68 is moved till the switch-bar 114 contacts with the terminal 113 to connect the latter with the terminal 111, the current is then conducted by the conducting-wire 10 to the electromagnet or solenoid 60 to excite the same to operate the pawl-lever 45, which pawl-lever 45 when the switch-lever 68 is in this latter position is released by the lug 75, and the pawl-lever 45 is therefore permitted to engage the ratchet-teeth 27 of the ratchet-disk 25 to rotate the indicating-roller 21 in the direction of the arrow $i$. (See Fig. 5.) Simultaneously with this movement of the switch-lever 68 the lever 73 moves in the direction of the arrow $j$ to force the pawl-lever 44 out of engaging position, so as not to engage with its pawl-disk 24, and similarly when the switch-lever 68 is moved till its switch-bar 114 contacts the terminal 112 to connect the terminals 111 and 112, the electromagnet or solenoid 53 is excited, the same as the electromagnet or solenoid 60 was excited, and the pawl-lever 44 is released from its lever 73. Simultaneously the lug 75 of the lever 74 contacts with the pawl-lever-connecting rod 55 to move the pawl-lever 45 out of engaging position, so as not to engage its pawl-disk 25, and thus each of the pawl-levers 44 and 45 are alternately brought into or out of engagement with their ratchet-disks 24 and 25 alternately to rotate said indicating-roller 21 in either direction. When the lever 68 is in its central position, as shown in Fig. 8, the lever 73 and the lug 75 of the lever 74 retain both of the pawl-levers 44 and 45 out of position to engage their ratchet-disks, and when both pawl-levers 44 and 45 are in this latter position the indicating-roller 21 is free to be operated by means of the knob 115, (see Fig. 21,) which is secured on the prolonged end of the shaft 116, and secured on its inner end is the pinion 23, which latter meshes with the gear-wheel 22. (Shown in dotted lines, see Fig. 4) The gear-pinion 23 is secured on the arbor 116, which has its bearing in the bore of the thimble 117. On the outer end of the thimble 117 is a flange 118, which is drilled to receive suitable wood-screws by which the bearing-thimble is secured and held in position to maintain the gear-pinion 23 in mesh or gear with its gear-wheel.

Having thus fully described this my invention, what I claim as new and useful, and desire to cover by Letters Patent of the United States therefor, is —

1. In a station-indicator, the combination with a revoluble indicating-roller, a station-indicating belt or band partially encircling said indicating-roller and having its free ends extending backwardly therefrom, and a pair of winding or take-up rollers connected to the ends of said indicating belt or band, of a toothed wheel situated to contact with said indicating belt or band and arranged to rotate equally and simultaneously with the indicating-roller, opposing ratchets situated at the ends of said indicating-roller, pawl-levers or vibratory latches situated adjacent the ends of said indicating-roller, means for alternately throwing said pawls or vibratory latches into and out of engagement with their ratchets, means for swinging or vibrating said pawl-levers or vibratory latches and means for yieldingly checking and limiting the rotation of said indicating-roller.

2. In a station-indicator, the combination with a revoluble indicating-roller, a station-indicating belt or band partially encircling said indicating-roller and having its free ends extending backwardly therefrom, and a pair of winding or take-up rollers connected to the ends of said indicating band or belt, of a toothed wheel situated to contact with said band or belt and arranged to rotate equally and simultaneously with said indicating-roller, opposing ratchets situated at the ends of said indicating-roller, pawl-levers or vibratory latches adjacent the ends of said indicating-roller, means for alternately throwing said pawls or vibratory latches into and out of engagement with their ratchets, independently-operated electromagnets and independent lever connections connecting each of said levers or vibratory latches to said independently-operated electromagnets, and means for checking and limiting the rotation of said indicating-roller.

3. In a station-indicator, the combination with a revoluble indicating-roller, a station-indicating band or belt encircling the front peripheral surface of said indicating-roller and having its ends extending rearwardly therefrom, slidingly-supported trunnions or pivotal centers situated at each end of said indicating-roller whereon said indicating-roller freely turns, and means situated at each end of said indicating-roller for intermittently rotating the same in opposite directions, of a pair of take-up rollers provided with longitudinally-extending axial or concentric bores and situated to the rear of said indicating-roller, one of which rollers is connected to one end of said indicating belt or band and the other to the other end thereof, said rollers each comprising a longitudinally-extending spring-stem situated centrally within the bore of said roller, a coil-spring surrounding the said stem, said spring secured at one end to said spring-stem and at its opposite end to said roller, centers or trunnions slidingly supported at each of the ends of said take-up rollers, one of which trunnions is provided with a tongue adapted to engage the end of said spring-stem whereby the tension of the spring may be increased or diminished, and means for engaging said tongue-trunnion to prevent its rotation with the tension of the spring.

4. In a station-indicator, the combination with a revoluble indicating-roller, of a station-indicating band or belt encircling the front peripheral surface of said indicating-roller having its ends extending rearwardly thereof, slidingly-supported trunnions or pivotal centers situated at each end of said indicating-roller whereon said indicating-roller freely turns, opposing ratchets situated at the ends of said indicating-roller, pawl-levers or vibratory latches situated adjacent the ends of said indicating-roller, sleeves wherein said trunnions are slidingly supported, collars slidably mounted on said sleeves and means for yieldingly pressing said collars against said vibratory latches, a gear-wheel situated at one end of said indicating-roller between the ratchet and said roller, a gear-pinion meshing with the latter gear-wheel, a pinion-shaft and a knob for turning said shaft, and means for moving one of the pawl-levers or vibratory latches into engagement with its ratchet and disengaging the opposing pawl-lever or vibratory latch from its ratchet.

5. In a station-indicator, the combination with a revoluble indicating-roller of a station-indicating band or belt encircling the front peripheral surface of said indicating-roller having its ends extending rearwardly thereof, slidingly-supported trunnions or pivotal centers situated at each end of said indicating-roller whereon said indicating-roller freely turns, opposing ratchets situated at the ends of said indicating-roller, pawl-levers or vibratory latches situated adjacent the ends of said indicating-roller, sleeves wherein said trunnions are slidingly supported, collars suitably mounted on said sleeves, means for yieldingly pressing said collars against said vibratory latches, a gear-wheel situated at one of the ends of said indicating-roller between the ratchet and said roller, a gear-pinion meshing with the latter gear-wheel, a pinion-shaft and a knob for turning said shaft, and means for retaining both of said pawl-latches or vibratory levers out of engagement with their ratchets to permit the free rotation of said indicating-roller.

6. In a station-indicator, the combination with a revoluble indicating-roller, of a station-indicating band or belt encircling the front peripheral surface of said indicating-roller having its ends extending rearwardly thereof, slidingly-supported trunnions or pivotal centers situated at each end of said indicating-roller whereon said indicating-roller freely turns, opposing ratchets situated at the ends of said indicating-roller, pawl-levers or vibratory latches situated adjacent the ends of said indicating-roller, pawl-lever-connecting rods, sleeves wherein said trunnions are slidably supported, collars slidably mounted on said sleeves, means for yieldingly pressing said collars against said vibratory latches, a gear-wheel situated at one of the ends of said indicating-roller between the ratchet and said roller, a gear-pinion meshing with the latter wheel, a pinion-shaft and a knob for turning said shaft, a pair of vertically-extending shafts situated adjacent each of said pawl-levers or vibratory latches, throw-out arms situated on each of said vertical shafts in position thereon to engage each of said connecting-rods to throw said pawls or vibratory latches out of engagement with their ratchet-wheels to permit the said indicating-roller to be operated by said knob-operated pinion, and means for simultaneously revolving both of said vertical shafts.

In testimony whereof I affix my signature in presence of two witnesses.

CHARLES E. JOHNSON.

Witnesses:
 THOMPSON R. BELL,
 FLORENCE GIMBEL.